US011881203B2

(12) United States Patent
Oetken et al.

(10) Patent No.: US 11,881,203 B2
(45) Date of Patent: Jan. 23, 2024

(54) SELECTIVE ACTIVE NOISE CANCELLATION ON A MACHINE

(71) Applicant: Caterpillar Paving Products Inc., Brooklyn Park, MN (US)

(72) Inventors: Nicholas A. Oetken, Brooklyn Park, MN (US); Clinton A. Metzger, Congerville, IL (US); Elizabeth R. K. Brockman, Charlotte, NC (US); Bryce David Uitermarkt, Zimmerman, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 19 days.

(21) Appl. No.: 17/738,494

(22) Filed: May 6, 2022

(65) Prior Publication Data

US 2023/0360628 A1 Nov. 9, 2023

(51) Int. Cl.
*G10K 11/178* (2006.01)

(52) U.S. Cl.
CPC .. *G10K 11/17883* (2018.01); *G10K 11/17823* (2018.01); *G10K 11/17881* (2018.01)

(58) Field of Classification Search
None
See application file for complete search history.

(56) References Cited

U.S. PATENT DOCUMENTS

| | | | | |
|---|---|---|---|---|
| 10,373,602 | B2 | 8/2019 | Zafeiropoulos | |
| 10,679,603 | B2 | 6/2020 | Keller | |
| 2005/0226434 | A1 | 10/2005 | Franz et al. | |
| 2013/0182865 | A1* | 7/2013 | Paul | G10K 11/17881 381/71.8 |
| 2018/0082673 | A1* | 3/2018 | Tzanetos | G10K 11/175 |
| 2022/0238091 | A1* | 7/2022 | Jasleen | G10K 11/17833 |

FOREIGN PATENT DOCUMENTS

CN 214175677 U 9/2021

* cited by examiner

*Primary Examiner* — Kenny H Truong
(74) *Attorney, Agent, or Firm* — Finnegan, Henderson, Farabow, Garrett & Dunner, L.L.P.

(57) ABSTRACT

A noise control system detects, identifies, and cancels specific, preselected sounds that an operator does not want to hear during operation of a machine. One or more of a microphone or another sensor detects sound vibrations or other operational parameters that result in the generation of sound vibrations during operation of the machine. A controller identifies, and selectively cancels only the specific, preselected sounds the operator does not want to hear while operating the machine by generating an anti-noise signal to interfere with the specific, preselected sounds.

18 Claims, 4 Drawing Sheets

SELECTIVE ACTIVE NOISE CANCELLATION ON A MACHINE

TECHNICAL FIELD

The present disclosure is directed to active noise cancellation, and more particularly, to an apparatus and method for actively cancelling selected acoustic signals generated during operation of a machine.

BACKGROUND

Active noise cancellation (ANC) is a method for reducing unwanted sound. Sound consists of vibrations in the air, which can be represented as a wave. If a speaker emits a sound whose wave has the same amplitude and an exact opposite polarity to the original sound, the waves cancel out and the result is no sound. A computer analyzes the waveform of the background aural or nonaural noise, then generates a similar waveform rotated 180 degrees out of phase to cancel background noise out by interference. This method differs from passive "noise cancellation" (sound proofing) such as insulation, sound-absorbing ceiling tiles, automobile mufflers or using headphones to suppress the noise. The advantages of active noise control methods compared to passive ones are: they are more effective, less bulky, and can be made to be selective, that is, to block unwanted noise (e.g., from vibrating components) but not useful sound (e.g., from an engine).

Active noise cancellation involves superimposing on a noise acoustic wave an opposite acoustic wave that destructively interferes with and cancels the noise acoustic wave. In active noise cancellation systems, the characteristics of the noise acoustic wave are sensed, a canceling acoustic wave is generated and delivered to a location through a speaker. The combined waves are monitored at the location and a feedback or error signal is produced for interactive adjustment of the cancellation of the noise acoustic wave.

Implementation of the active noise cancellation principle is arranged to accommodate changes in the frequency and intensity characteristics of the noise acoustic wave by incorporating adaptability into the feedback or error path of the active noise cancellation system.

Active noise cancellation systems generally are designed to indiscriminately eliminate all noises that might interfere with the quiet enjoyment of a space. Thus, with current technology, an operator of a machine does not have the ability to selectively identify and allow sounds from certain operating systems, components, or operation of the machine to enter the cab where the operator is sitting, while cancelling out other sounds that are a nuisance, are not of interest to the operator, or do not provide useful information to the operator.

U. S. Patent Application Publication No. US 2005/0226434, describes a noise reduction system employed in a working environment to reduce the noise that a user within that working environment experiences. The system determines the user's location within the working environment and produces a remedial noise profile that is configured to reduce the noise that the user experiences at the user's current location. The noise reduction system includes multiple speakers installed in the working environment. A signal that represents the remedial noise profile is used to drive one or more speakers proximate the user's current location so that the user experiences less noise at that location.

One disadvantage of the noise reduction system disclosed in the 2005/0226434 publication is that the system can only perform overall noise reduction that is not selective or targeted to cancel only the sounds that are not of interest or that are an annoyance to an operator of the machine, while permitting the operator to continue to hear sounds that may be of importance or useful to the operator in evaluating the ongoing operating performance of the machine. The system cannot provide an effective and targeted sound cancellation for the operator based the operator's preferences.

The apparatus and method for active noise cancellation of only selectively identified and targeted sounds that an operator of a machine may find to be an annoyance or of little utility according to this disclosure solves one or more of the problems set forth above.

SUMMARY

In one aspect, the present disclosure is directed to a noise control system for detecting, identifying, and cancelling specific, preselected sounds that an operator does not want to hear during operation of a machine. The noise control system includes one or more of a microphone or another sensor configured for detecting sound vibrations or other operational parameters that result in the generation of sound vibrations during operation of the machine. A controller is configured for identifying and selectively cancelling only the specific, preselected sounds the operator does not want to hear while operating the machine by generating an anti-noise signal to interfere with the specific, preselected sounds.

In another aspect, the present disclosure is directed to a method for controlling the sounds that an operator hears when operating a machine. The method includes detecting and identifying preselected sounds that a machine operator does not want to hear during operation of the machine. The method includes using one or more of a microphone or another sensor configured for detecting sound vibrations or other operational parameters that result in the generation of sound vibrations during operation of the machine. The method further includes selectively cancelling only the preselected sounds the machine operator does not want to hear while operating the machine by generating an anti-noise signal to interfere with the preselected sounds.

In yet another aspect, the present disclosure is directed to a machine that includes an active noise cancellation system. The active noise cancellation system is configured for detecting, identifying, and cancelling specific, preselected sounds that an operator does not want to hear during operation of a machine. The active noise cancellation system includes one or more of a microphone or another sensor configured for detecting sound vibrations or other operational parameters that result in the generation of sound vibrations during operation of the machine. A controller is configured for identifying and selectively cancelling only the specific, preselected sounds the operator does not want to hear while operating the machine by generating an anti-noise signal to interfere with the specific, preselected sounds.

DETAILED DESCRIPTION

Figure 1:
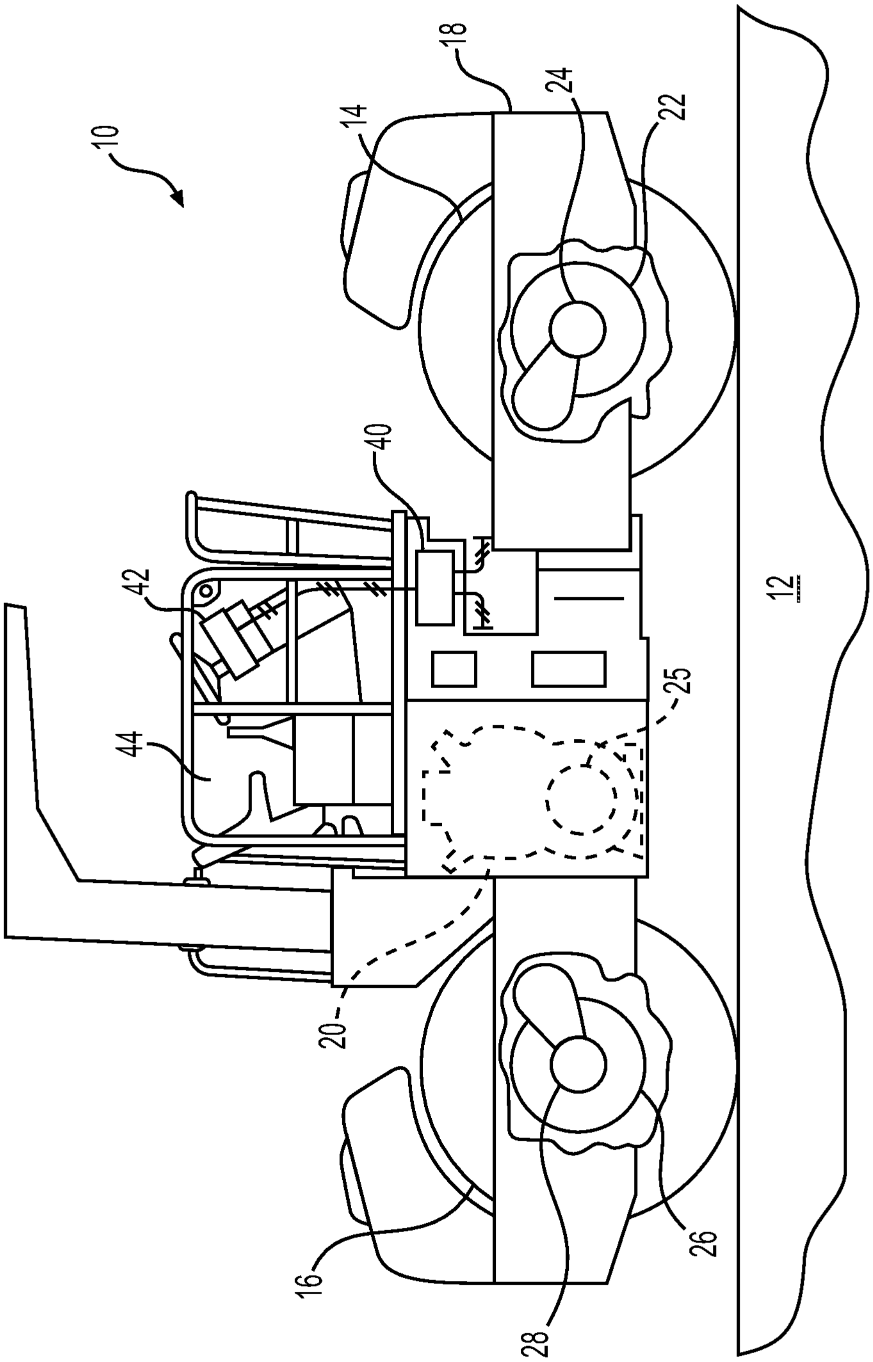
FIG. 1 is an illustration of an exemplary vibratory compactor, which is a machine that may include an Active Noise Cancellation (ANC) system according to embodiments of this disclosure.

FIG. 1 shows an exemplary vibratory compactor 10 as an example of a machine that may be used in the road building and construction industry, and that may benefit from the inclusion of an Active Noise Control (ANC) system 100 (shown in FIG. 2) for selectively controlling the particular sounds that an operator may want to hear within a machine operator's compartment or cab 44 in accordance with one embodiment.

Vibratory work machines such as compactors are often employed to compact soil, gravel, asphalt, and other materials. These vibratory work machines may include plate-type compactors and rotating drum compactors. As shown in FIG. 1, a vibratory work machine may be a double-drum compactor 10 used for compacting a material on a work surface 12, such as soil, gravel, or asphalt to increase the density of the material. While the ANC system according to embodiments of this disclosure may be particularly applicable to a vibratory compactor such as the double-drum compactor shown in FIG. 1, the disclosed ANC system and methods are not limited to this application, and may be applicable to all types of machinery that may benefit from selective noise cancellation, such as other construction vehicles.

The exemplary vibratory compactor 10 shown in FIG. 1 has a first compacting drum 14 and a second compacting drum 16 rotatably mounted on a main frame 18. The compactor 10 also has an engine 20 that may be used to generate mechanical and/or electrical power for propelling the compactor 10. Alternative embodiments of the vibratory compactor 10 may include alternative power sources, such as a fuel cell, an electric generator and electric motor, or a battery and electric motor. The first compacting drum 14 may include a first vibratory mechanism 22 that is operatively connected to a first motor 24. The second compacting drum 16 may include a second vibratory mechanism 26 that is operatively connected to a second motor 28. It should be understood from this disclosure that the vibratory work machine may have more or fewer than two compacting drums and vibratory mechanisms.

The first and second motors 24, 28 may propel the first and second compacting drums 14, 16, respectively, and the motors may be operatively coupled to a power source 25, which may be connected to the engine 20. The power source 25 may be an electric generator, a fluid pump and motor, or any other suitable device for propelling the compactor 10 and providing power to the first and second vibratory mechanisms 22, 26 and other systems of the compactor 10. The first and second motors 24, 28 may be electric motors in embodiments where the power source 25 provides electrical power. Alternatively, where the power source 25 provides mechanical or hydraulic power, the motors 24, 28 may be fluid motors. The motors 24, 28 may be operatively coupled to the power source 25 with mechanical drive components, electrical wires, fluid conduits, or any other suitable connections.

The compactor 10 may include a controller 40 that determines a decoupling point of the vibratory mechanisms 22, 26. At the decoupling point, compacting drums 14, 16 may lose their surface contact to the material 12, and the vibratory mechanisms or compacting drums may become airborne. The controller 40 may also include one or more processors configured to perform active noise cancellation according to various implementations of the ANC system 100 and noise cancellation module 30 shown in FIG. 2 for detecting, identifying, and selectively controlling the sounds that may be heard by an operator in operator compartment (cabin or cab) 44, and sounds that may be cancelled or reduced. Throughout this application the terms "noise" and "sound" are used interchangeably. Although the operator "cabin" 44 shown in FIG. 1 is partially open, one of ordinary skill in the art will recognize that the vibratory compactor 10 or other machine may include a completely enclosed operator cabin, which may lend itself to effective noise cancellation through the use of one or more speakers or other vibratory surfaces within the operator cabin. Nonetheless, even with an open space for accommodating an operator, a machine such as the vibratory compactor shown in FIG. 1, or other construction vehicle, may include speakers or other sound-generating surfaces in the vicinity of the operator that enable selective noise cancellation according to various implementations of this disclosure.

The controller 40 may also be operatively coupled to an operator or user input 42 that enables the operator of the compactor 10 to set, for example, a desired vibratory control characteristic in some embodiments. The controller 40 may also be configured to include the noise cancellation module 30, shown in FIG. 2. A signal processing circuit/processor, or plurality of processors 34 of the noise cancellation module 30 may be configured to receive inputs from an operator designating particular sounds or categories, frequencies, or amplitudes of sounds that the operator desires to reduce or eliminate so that other sounds, such as particular noises generated by an engine or electric motor of the compactor, or vibration noises characteristic of the interaction between the compacting drums 14, 16 and the work surface 12, may be heard more clearly by the operator during operation of the machine. The vibratory control characteristic in some embodiments may include a vibratory amplitude limit. The operator input 42 may be one or more of a vibratory control knob, lever, switch or any other suitable device that the operator uses to set the vibratory amplitude characteristic, or designate which sounds are to be cancelled by the ANC system. In one exemplary embodiment, the operator input 42 may be a touch display, with icons and/or sliders or control bars that designate the particular types of sounds the operator may want to cancel, and/or other sounds the operator may want to hear.

The vibratory mechanism of a vibratory compactor may provide one or more frequency and amplitude settings. In operation, the vibration amplitude and frequency of a compactor may be changed by a user to suit a particular application. The suitable amplitude and frequency of the vibration may vary depending on the characteristics of the material to be compacted. For example, the vibration amplitude and frequency suitable for compacting asphalt for a road may be different from the vibration amplitude and frequency suitable for compacting gravel or soil for a road or footpath. Also, a compacting process may often require compaction with different amplitude and frequency levels at the beginning and end of the process. Furthermore, when a material such as asphalt cools down, its hardness often changes. Compaction with different amplitude and frequency levels may be required based on the temperature or other characteristics of the material. As a result of operating a vibratory compactor at different frequencies and amplitude settings, an operator may also want to change the frequency ranges or other parameters for sounds that should be cancelled or reduced by the ANC system according to embodiments of this disclosure.

Figure 2:
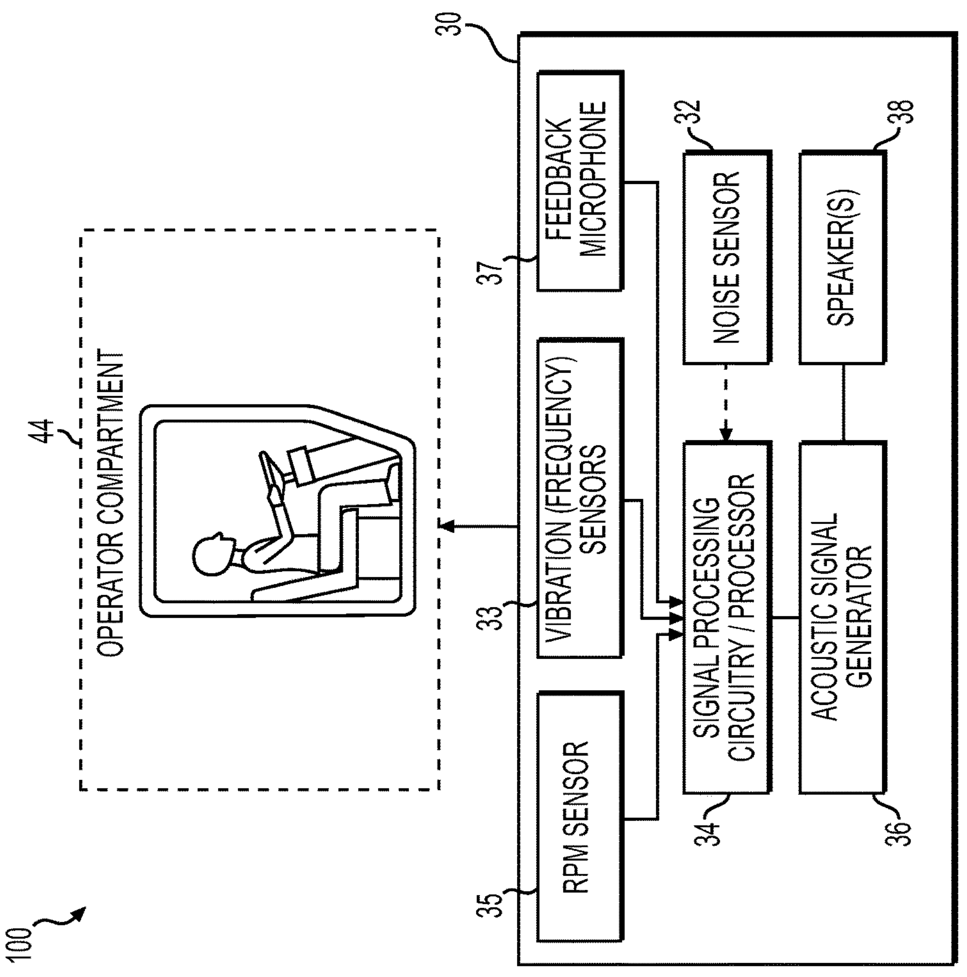
FIG. 2 is a schematic illustration of an exemplary Active Noise Cancellation (ANC) system according to an embodiment of this disclosure.

In the exemplary embodiment of an ANC system according to this disclosure, as shown in FIG. 2, the noise cancellation module 30 may include one or more noise sensors 32, the signal processing circuitry, for example, one or more processors 34, and an acoustic signal generator 36. In use, the noise sensor 32 can be any type of sensor or device that can measure sounds. For example, the noise sensor 32 may include a microphone or other suitable transducer that is configured to dynamically sense a sound acoustic wave inside, outside, or in the vicinity of operator compartment 44. The noise sensor 32 may be connected to the one or more processors 34 through either a wireless network or a wired network and transfer a noise signal representative of a sound profile at the operator's location to the processor 34. The processor 34 may be configured to process the sound signal received from the noise sensor 32 and generate a noise cancellation signal corresponding to the sound profile within the operator's compartment 44. The noise cancellation signal may then be transmitted to the acoustic signal generator 36, which may generate a noise cancellation wave based on the noise cancellation signal received from the processor 34 and transmit the noise cancellation wave to a space within the operator's compartment 44 to interfere with the sound acoustic wave, thereby reducing the noise at and around the operator's location. In one embodiment, the noise cancellation wave may be a sound wave which has a same amplitude and opposite phase to the sound acoustic wave, and therefore, the noise cancellation wave cancels out or reduces the amplitude of the sound acoustic wave within the operator's compartment 44. In one embodiment, the acoustic signal generator 36 may include at least one speaker 38 for generating the noise cancellation wave within the operator's compartment 44.

An Active Noise Control (ANC) system according to various embodiments of this disclosure may be configured to attenuate undesired noise using feedforward and feedback structures to adaptively remove undesirable noise within a space such as an operator's cab on a vehicle. The ANC system cancels or reduces unwanted noise by generating cancellation sound waves to destructively interfere with the unwanted audible noise. Destructive interference results when noise and "anti-noise," which is largely identical in magnitude but opposite in phase to the noise, combine to reduce the sound pressure level (SPL) at a location. In an operator's cab on a machine or vehicle such as the vibratory compactor 10 shown in FIG. 1, potential sources of undesirable noise may include vibrations transmitted to other machine parts or components by a vibratory drive shaft configured to introduce various vibration frequencies to the compactor drums 14, 16 while the vibratory compactor 10 is compacting material underneath the compactor drums as the vibratory compactor travels along the work surface 12. Other sounds may include audible sounds generated by an engine, electric motor, or other drive train components propelling the compactor, the interaction between the compactor drums 14, 16 and a work surface 12 on which the compactor is operating, sounds generated by hydraulic or electric pumps or motors used for powering various accessories or operating various systems or subsystems of the machine, sounds radiated by the vibration of other parts of the vehicle, and other sounds associated with operation of the vibratory compactor. Unwanted sounds or noise may vary with the speed, work surface conditions, and operating states of the vehicle.

One exemplary embodiment of an ANC system according to this disclosure may be implemented on a vehicle such as a vibratory compactor in order to minimize only the undesirable noises heard by an operator inside the operator's cab or in the vicinity of the operator's station on the vehicle resulting from the interaction between the compactor drums 14, 16 and the work surface 12, while allowing the operator to continue to hear sounds generated by the engine, electric motor, electric generator, hydraulics, or other operating systems of the machine. Alternatively, an operator may want to hear the sounds generated by the interaction between the compactor drums 14, 16 and the work surface 12, which may be useful to the operator as a factor that aids in determining whether the compactor is traveling at the proper speed for compaction of a particular material on work surface 12 under certain environmental and other conditions, whether the intensity, frequency, or amplitude of vibration is proper for the particular material being compacted, and whether the material being compacted on the work surface is responding to the compaction as expected during the compacting operation. Certain sounds may be useful to an operator during operation of the vehicle by providing audible input that may assist the operator in performing his job as efficiently, effectively, and safely as possible.

In embodiments of an ANC system according to the present disclosure, wherein the noises generated by the interaction between the compactor drums 14, 16 and the work surface 12 ("road noises") are either considered a nuisance by an operator, or are considered to be valuable input by the operator for monitoring and controlling various control systems or operating parameters of the compactor, the ANC system may be configured to use vibration sensors 33 to sense work surface induced vibrations generated at the interface between the compactor drums 14, 16 and the work surface 12. In a case where the operator wants to minimize or eliminate these road noises, the road noises inside the operator's cabin may be cancelled, or reduced in level, by using speakers or other vibratory surfaces to generate sound waves that are ideally opposite in phase and identical in magnitude to the road noise to be reduced at the typical location of an operator's ears. Cancelling such road noise may enable the operator to hear other noises such as engine noises or noises generated by other systems or subsystems on the vehicle. For example, an operator may suspect that a crankshaft bearing on an internal combustion engine powering the compactor is beginning to wear, or a timing chain or other component of the engine has broken, resulting in sounds with particular characteristics, such as amplitudes, and frequencies that fall within certain ranges, during operation of the engine at particular revolutions per minute, which can only be heard by the operator within the cabin if the road noises are selectively cancelled or significantly reduced.

An ANC system according to various embodiments of this disclosure may include one or more processors and memories that are configured to store noise models associated with a number of different operational characteristics for different makes and models of machines. The ANC system may be configured to compare incoming noise signals, including, in some cases, only certain preselected noise signals, with a stored library of existing noise models, and determine whether certain incoming noise signals are in the library. An operator on a machine that includes an ANC system with these capabilities may be able to look up and preselect only certain sounds that may be of interest to the operator during operation of the machine (and so should not be cancelled by the ANC system) based on the empirical and historical data regarding sounds stored in the library as existing noise models. The existing noise models stored in the library may be categorized based on types of machine, systems, components, operations, and other identifiers of the circumstances that resulted in the generation and recording of each noise model. In an exemplary implementation of an ANC system according to this disclosure, an operator may want to be able to hear whether an internal combustion engine propelling the vehicle is experiencing “knock” or the sounds associated with premature combustion, which may result in damage to an engine, or inefficient operation. Alternatively, in the case of an electric motor powered compactor or other machine, an operator may want to listen for any noises that may be indicative of overloading or overheating of the electric motor, which again may only be heard by the operator within the cabin if the road noises are cancelled or significantly reduced. Accordingly, various embodiments of an ANC system according to this disclosure may be configured to enable an operator to selectively cancel one or more of road noises, engine noises, or other sounds that are either an annoyance to the operator or that do not provide any useful information to the operator during operation of the machine, thus allowing the operator to hear the sounds that are useful in monitoring and implementing the most efficient, effective, and safe operation of the machine. The disclosed embodiments of an ANC system according to this disclosure may also create a more pleasurable and less fatiguing ride for an operator by reducing or eliminating unpleasant and noninformative sounds, as well as enabling the manufacturer of the vehicle to use less sound insulation and lighter weight materials, thereby decreasing energy consumption and reducing emissions.

In additional or alternative embodiments of an ANC system according to this disclosure, the ANC system implemented on a vehicle such as a vibratory compactor may be configured to minimize undesirable vehicle interior noise originating from the narrowband acoustic and vibrational emissions from the vehicle engine and exhaust system. An exemplary ANC system according to embodiments of this disclosure may be configured to use a non-acoustic signal, such as a revolutions-per-minute (RPM) sensor 35, or a frequency (vibration) sensor on a vibratory drive shaft, that generate reference signals representative of the engine speed or actual frequency of the vibratory drive shaft. The reference signals may be used to generate sound waves that are opposite in phase to the engine noise and/or vibratory shaft frequencies that are audible in the operator cab, and that are not providing any useful input to the operator. In some embodiments of an ANC system according to this disclosure, the ANC system may not require vibration sensors or microphones since the system relies exclusively on data retrieved from an RPM sensor. While an exemplary ANC system configured to cancel road noises may be designed to cancel broadband signals, an alternative ANC system, or variation to an ANC system may be designed and optimized to cancel narrowband signals, such as individual engine harmonics. ANC systems within a vehicle such a vibratory compactor may be configured to be selectively switched by an operator, or automatically controlled, from the ability to cancel broadband noises such as road noises to the ability to cancel narrowband signals, such as individual engine orders, or the noises associated with the operation of particular systems or subsystems of the vehicle.

Such vehicle-based ANC systems may be Least Mean Square (LMS) adaptive feed-forward systems that continuously adapt noise filters based on both noise inputs (e.g., acceleration inputs from vibration sensors in an ANC system that is configured to cancel road noises or other vibration noises) and signals of error microphones located in various positions inside and/or outside the operator's cabin. In addition, an exemplary vehicle-based ANC system using a LMS adaptive feed-forward system according to an embodiment of this disclosure may be configured such that an operator can selectively control what noises or ranges of sounds will be filtered, what noises will be left undisturbed, and what noises will be cancelled.

An exemplary embodiment of an ANC system according to this disclosure may include at least one exterior microphone and one interior feedback microphone configured to receive a plurality of audio signals generated in the exterior environment surrounding an operator's cab on a machine such as the vibratory compactor 10 shown in FIG. 1, as well as receive residual noise signals within the operator cabin that have not been cancelled by the destructive interference generated by a transducer, such as a speaker in the cabin. The signal processor/signal processing circuitry 34 of the noise cancellation module 30 shown in FIG. 2 may be in electrical communication with the exterior microphones and the interior microphones. The signal processor may be configured to receive an audio signal from at least one of the exterior and/or interior microphones and generate an anti-noise signal that is designed to counteract the at least one audio signal generated in the exterior environment. The system also may include a transducer in electrical communication with the signal processor and attached to one or more speakers or other vibratory surfaces capable of generating destructive interference audio signals within the operator's cab. The transducer may be configured to receive the anti-noise signal from the signal processor and convert the anti-noise signal into a destructive interference audio signal propagated by the speakers or other vibratory surfaces. For example, the destructive interference audio signal may result from a mechanical force generated by the transducer that causes vibration of a noise-coupling surface. The vibration of the noise coupling surface counteracts/cancels the vibration associated with the outside noise signals as they reach the noise-coupling surface. The interior, feedback microphone may be configured to receive any residual noise signals within the cabin that have not been cancelled by the destructive interference, determine whether these residual noise signals are characteristic of sounds that the operator does not want to hear, and then transmit the undesired residual noise signals to the signal processor for generation of additional anti-noise signals that may be desired to cancel the residual noise signals.

One of ordinary skill in the art will recognize that the hardware and/or software used for the noise cancellation module 30 shown in FIG. 2 may vary depending on the ANC system implementation. In some embodiments, the ANC system 100 may be implemented as a part of a distributed computer network. The ANC system 100 may include a number of device systems, and a server system coupled to a communication network via a plurality of communication links. There may be any number of devices and servers in a system. The communication network may provide a mechanism for allowing the various components of the ANC system 100 to communicate and exchange information with each other. A computer-implemented or computer-executable version of the ANC system according to this disclosure may be embodied using, stored on, or associated with a computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, conductive wire, fiber optic lines, and conductors arranged in a bus. Transmission media can also take the form of electromagnetic, radio frequency, acoustic, or light waves, such as those generated during radio wave and infrared data communications.

In some embodiments of an ANC system 100 according to this disclosure, the signal processing circuitry 34 of the noise cancellation module 30 may be configured to generate an anti-noise signal based on the noise signal received by a feed forward microphone. Specifically, in some embodiments, the signal processor may analyze the waveform of the dynamic and/or static noise signals received from one or more exterior microphones. The signal processing circuitry 34 may then use an algorithm or a plurality of algorithms to generate a signal or signals that will either phase shift or invert the polarity of the received noise signal or signals. This inverted signal (in anti-phase) is then amplified and filtered so that a transducer connected to or part of one or more speakers in the operator's cab can create a sound wave directly proportional to the amplitude of the original waveform, creating destructive interference.

The signal processor may transmit the anti-noise signal to the one or more transducers. In one embodiment, the anti-noise signal may be enhanced with necessary gains, delays, and filtration by the signal processor so that the transducer can generate a more effective sound wave that creates a destructive interference. The signal processor may be hard wired to the transducer or may be communicatively coupled to the transducer. Once a transducer receives an anti-noise signal, the transducer can generate a destructive interference, such as mechanical forces and electrical pulse patterns, based on the received anti-noise signal. When the mechanical forces are applied to a speaker or other vibratory surface, the displacements/vibrations of the vibratory surface generate a sound wave that creates a destructive interference. The destructive interference is generated at the precise time to achieve an optimal noise change so that the outside noise that enters the interior of a defined space, such as the inside of the operator cabin 44, is optimally minimized. The precise time to achieve an optimal noise change may be calculated by dividing the distance between the exterior microphone and the vibratory surface or speakers within the operator cabin 44, and the speed of sound at the specific location of the defined space. The speed of sound can change based on the atmospheric pressure and temperature of the specific location. In various embodiments of this disclosure, the signal processing circuitry 34 may also be configured to selectively identify the sounds that are predetermined to be of interest by an operator or other control means, and then generate only anti-noise signals that produce destructive interference for the sounds received by the microphone that are not of interest to the operator or other control means.

INDUSTRIAL APPLICABILITY

Figure 3:
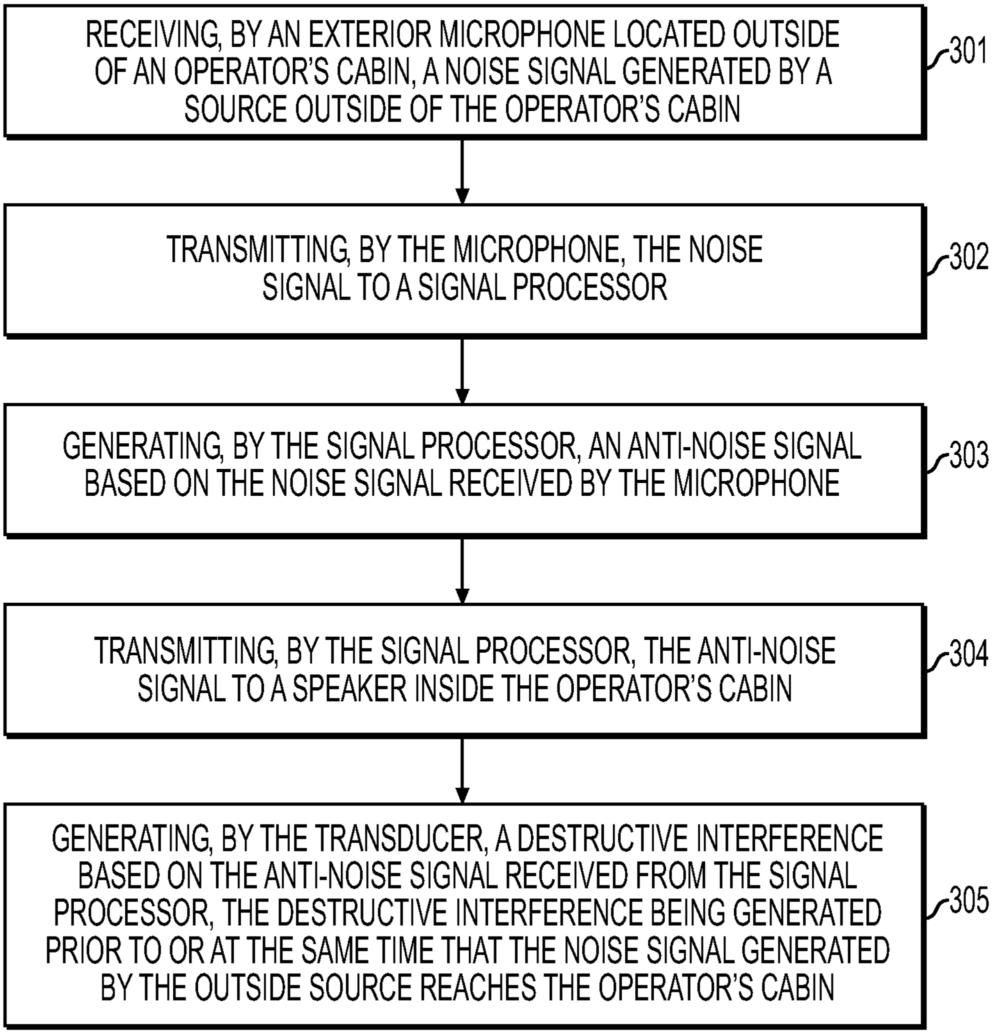
FIG. 3 is a flow chart illustrating an exemplary disclosed method for reducing preselected sounds within an operator's cabin on a machine such as the vibratory compactor shown in FIG. 1.
Figure 4:
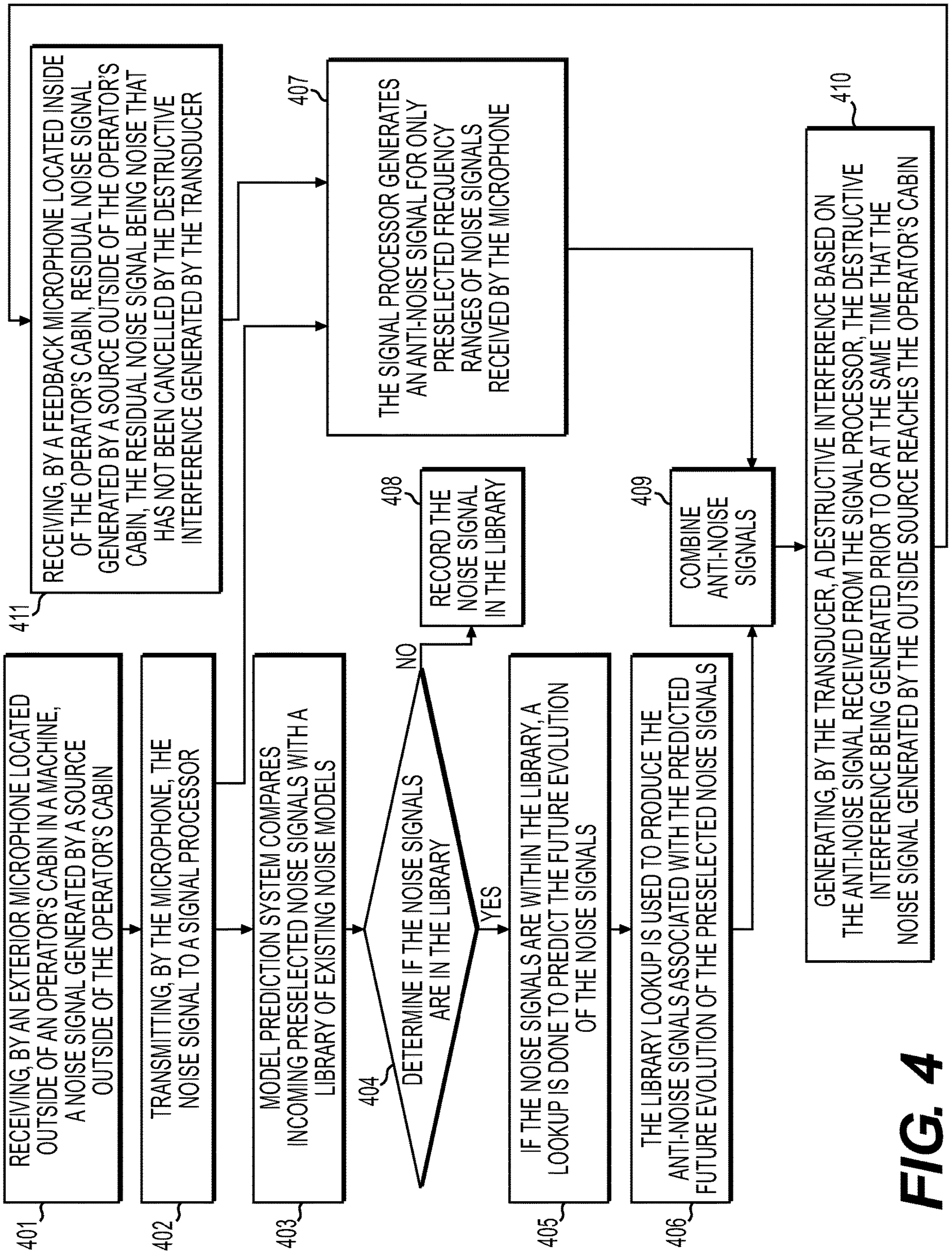
FIG. 4 is a flow chart illustrating an exemplary disclosed method for identifying and reducing preselected sounds within an operator's cabin on a machine.

Referring now to FIGS. 3 and 4, the flow diagrams illustrate exemplary algorithms or series of action steps that an ANC system and special purpose controller according to an embodiment of this disclosure may be configured to implement.

In step 301 of the flowchart in FIG. 3, a microphone (e.g., the noise sensor 32 shown in FIG. 2) located outside of an operator's cabin on a vehicle such as the vibratory compactor 10 shown in FIG. 1, may receive a noise signal generated by a source outside of the operator's cabin, such as a noise signal indicative of road noise generated by the interaction between compactor drums 14, 16 and work surface 12, or engine or other system noise created by the operation of one or more systems associated with the engine 20 or other components on the machine.

In step 302, the microphone may transmit the noise signal to the signal processor 34. In step 303, upon receiving the noise signal from the microphone, the signal processor 34 may generate an anti-noise signal configured to interfere with and reduce or cancel the noise signal received from the microphone. In one embodiment, the signal processor 34 may analyze the waveform of the noise signals received from one or more of an exterior microphone and an interior microphone. The signal processor 34 may then use an algorithm or a plurality of algorithms to generate a modified signal or signals that will either phase shift or invert the polarity of the received noise signal or signals. This inverted signal (in anti-phase) is then amplified and filtered so that a transducer can create a sound wave directly proportional to the amplitude of the received waveform, creating an enhanced destructive interference.

In step 304, the signal processor 34 may then transmit the generated anti-noise signal to a speaker or other vibratory surface inside the operator's cabin. In one embodiment, the anti-noise signal may be enhanced with necessary gains, delays, and filtration so that the transducer can generate a more effective sound wave that creates a destructive interference.

At step 305, a transducer associated with the speaker or other vibratory surface inside the operator's cabin may generate a destructive interference based on the anti-noise signal received from the signal processor, with the destructive interference being generated prior to or at the same time that the noise signal generated by the outside source reaches the operator's cabin. Additionally, the signal processor 34 may generate an anti-noise signal to cancel residual noise signals picked up by an interior microphone positioned within the operator's cabin 44. In one embodiment, the transducer generates mechanical forces. When the mechanical forces are applied to a window or another noise coupling or vibratory surface, the displacements/vibrations of the window or other vibratory surface generate sound waves that create destructive interference.

FIG. 4 illustrates a flowchart for another exemplary implementation of a noise cancelling method according to this disclosure. The noise cancelling system for performing the exemplary noise cancelling method may include a signal processor processing noise signals received from both an exterior feed forward microphone and an interior feedback microphone and transmitting generated anti-noise signals to a transducer in accordance with different embodiments of the disclosure.

In step 401, a microphone located outside of a defined space such as an operator's cabin on a machine such as the vibratory compactor 10 shown in FIG. 1 may receive or pick up noise signals generated by a source outside of the operator's cabin. For example, an exterior microphone outside of the operator's cabin may pick up noise signals such as sounds generated by the interaction between vibratory drums 14, 16 of the vibratory compactor 10 shown in FIG. 1 and the work surface 12.

In step 402, the microphone may transmit the noise signals picked up by the feed forward microphone to a signal processor. In one embodiment, the feed forward microphone transmits an electrical signal that is associated with the noise signal to the signal processor. The signal processor may generate an anti-noise signal as described above, based on the received noise signal. Necessary gains, delays and filters may have been incorporated into the calculation for the anti-noise signal. The signal processor may transmit the anti-noise signal to the transducer, and the transducer may generate a destructive interference based on the anti-noise signal received from the signal processor. For example, the transducer generates mechanical forces that cause a speaker cone, window, or other vibratory surface to vibrate to create a sound wave based on the anti-noise signal received by the signal processor. The vibration is a destructive interference to the noise signal received from the exterior microphone. The exterior noise signal reaches the surface where the transducer is mounted at the same time or after the transducer has created the vibrations so that the noise signal does not pass into the interior of the defined space.

In alternative embodiments or variations of the same embodiment, one or more interior feedback microphones may pick up any residual noise signal that is audible and not cancelled by the destructive interference created by the transducer. The interior feedback microphone may then transmit the residual noise signal to the signal processor. If the interior feedback microphone does not pick up any residual noise signal that is audible and not cancelled by the destructive interference created by the transducer, then the interior feedback microphone may continue to monitor for residual noise signals. In one exemplary embodiment, the signal processor may determine if the received residual noise signal originated from the exterior of the operator's cabin and is associated with the noise signal received from the exterior microphone, or whether the noise signal received from the interior feedback microphone originated from within the operator's cabin. For example, the signal processor may be able to distinguish an engine hum noise signal that is associated with an engine hum noise signal received previously from the external feed forward microphone and people talking within the operator's cabin. In such an embodiment, the signal processor may modify the anti-noise for only the engine hum noise signal and not the people talking noise signal. Another example of how the system may discern interior versus exterior noise is to compare the time delay between the feed forward and feedback microphones. If a signal is heard on the internal microphone first, and then at a later time with less intensity, a similar signal is heard on the external microphone, the signal likely originated from inside the environment. However, if the signal is first detected with a higher intensity by an exterior microphone outside the operator's cabin, and then at a later time heard inside the operator's cabin with a lesser intensity, then the signal likely originated from outside the operator's cabin.

A predictive model-based noise cancellation system according to embodiments of this disclosure may combine the features of an ANC module without prediction capabilities, which may include feed forward and feedback noise cancellation features, and prediction models. The predictive model-based noise cancellation system may provide for better detection and generation of destructive interference of noise signals. For example, using the predictive model-based noise cancellation system, a signal processor may quickly scan a library of previously detected and recorded noises made by various models and makes of the machine while performing various work tasks, such as the road noises made by a particular vibratory compactor during the process of compacting asphalt under particular environmental conditions, the engine noises made by an internal combustion engine operating a particular vibratory compactor, the noises made by an electric or hydraulic motor or other power plant used for propelling a vibratory compactor that does not include an internal combustion engine, exhaust noises, and sounds of hydraulic or electrical systems, etc., associated with operation of the machine, and use the noise's predictability to better anticipate and quickly generate a destructive interface sound wave. The predictive model-based noise cancellation system may be configured to use various data matching techniques when looking for a match between observed microphone samples and existing models stored in the library of sounds. Techniques for the match detection may include, but are not limited to, time-correlation techniques, least-mean-squares, Kalman filters, Fourier analysis, Bayesian methods, statistical methods, methods involving machine learning, polynomial fitting, Monte-Carlo methods, linear regression, regularization, direct pulse-response identification, wavelet methods, Hammerstein-Wiener methods, and nonlinear least squares. In some embodiments, if the noise cancellation system determines that an existing or already detected noise is currently being presented to the signal processor 34, the signal processor may look up the noise model's time evolution to determine what the next following samples of the microphone might look like (i.e. predict the next sounds), and actively track the noise correlation. The signal processor 34 can use the information to generate anti-noise signals to transmit to the acoustic signal generator 36 in order to augment the actions of the ANC module 30.

If a noise signal picked up by the noise sensor 32 is stored within the library, then a model prediction module of the signal processor 34 may use the library to predict the future evolution of the noise signal. The library may include a representative record for each noise signal. Each record for each noise signal may include information associated with a predicted evolution of the noise. For example, a noise signal of an engine or other power plant experiencing a particular type of mechanical or electrical malfunction may have an associated time base, relative profile of amplitude, time-evolving frequency content, time-evolving phase content, and perhaps stochastic or random acoustic inclusions over the period of interest. If, however, the noise being presented to the model prediction module is a new noise signal, one that has not been observed or heard by the signal processor or stored in the library storage, the model prediction module may begin to perform a noise signal recording as part of a machine learning process. This recording may be considered a candidate noise signal and may be stored in the library, but not yet used for ANC. This candidate signal may be considered to have a low confidence metric because it was only observed once or a handful of times. It may not be useful yet to incorporate it into the ANC scheme because, the candidate noise recordings do not yet faithfully represent the actual noise signal because of statistical noise, and the candidate signal may be a single event or rare event which is not worth devoting resources to. Therefore, the model prediction module may consider the candidate signal stored in the library as a temporary item. If the candidate signal is observed again and enough times within a certain period of time, the confidence metric of the candidate signal will grow. Once the confidence metric crosses a threshold, the candidate signal may then be considered a bona fide noise signal for the given environment. Its confidence metric may be a piece of information that is tied to the noise signal model, which allows the system to know how much it can rely on the information within the noise model to cancel unwanted noise signals.

Each time a model prediction system observes noise signals that it can match to a candidate signal or a bona fide signal in a model library, that model's confidence metric will incrementally increase. Furthermore, the noise models will be altered and improved with each observation by various methods which can include, but are not limited to, least-mean-squares, Kalman filters, Fourier analysis, Bayesian methods, statistical inference, methods involving machine learning, polynomial fitting, system identification techniques, linear regression, regularization, direct pulse-response identification, wavelet methods, Monte-Carlo methods, Hammerstein-Wiener methods, parametric model ID, and nonlinear least squares. The ANC module 30 may generate an anti-noise signal in parallel with the model prediction module. The signal processor 34 may perform a combination of these two anti-noise signals to produce the singular signal that is sent to the acoustic signal generator 36. In one exemplary implementation, the signal processor 34 may combine the results of a standard anti-noise signal with a weighted version of the model prediction module's results, where the weight applied to the model prediction anti-noise signal is a function of the confidence metric of the noise model being currently observed. In this way older more refined noise models found in the library may be able to contribute more to the noise cancelling performance of the system, while newer less well-learned models will only contribute a small amount.

In step 403 of the exemplary implementation of a noise cancellation method using a model prediction module, as shown in FIG. 4, the model prediction module compares incoming preselected noise signals, in some implementations identified by an operator, as being the types of sounds that the operator would like to hear when operating the machine, with a library of existing noise signal models or records. In step 404, a determination may be made by the signal processor 34 whether the library of existing noise signal models includes the received noise signal. If the received noise signal is found in the library of existing noise signals, then information regarding the predicted future evolution of the noise signal may be extracted or retrieved from the library, in step 405. The predicted future evolution of the noise signal may include predicted noise signals associated with the received noise signal. In step 406, the predicted future evolution of the noise signal may be used by the signal processor to generate anti-noise signals associated with the predicted future evolution of the noise signals. In step 408, if a noise signal received from the feed forward microphone is not found in the library, the signal processor may record the noise signal and store the noise signal in the library.

As shown in step 407, in some embodiments, the signal processor 34 may generate an anti-noise signal for only the preselected frequency ranges of noise signals received by a microphone. As discussed above, the preselection of particular noise signals of interest to an operator may be performed by the operator using inputs such as selections on a touch screen or other input device within the operator cabin.

Once the anti-noise signal is generated, in steps 406 and 407, the signal processor may combine the anti-noise signal associated with the noise signal transmitted by the feed forward microphone and the anti-noise signals associated with the predicted future evolution noise signals. The signal processor may then send the combined signals to a transducer, step 409. In step 410, using the combined signal from the ANC module, the transducer may generate a mechanical force to create vibrations of a speaker cone or other vibratory surface within the operator's cabin that are used as destructive interference signals. The destructive interference signals attempt to cancel out the exterior noise signals. In one embodiment, the exterior noise signals arrive at the vicinity of the operator sitting in the operator's cabin at the same time or after the transducer powering the speaker or other vibratory surface begins to generate the destructive interference signals. In step 411, a feedback microphone located inside of the operator's cabin 44 may receive residual noise signals generated by a source outside of the operator's cabin. The residual noise signal may be a noise signal that has not been completely cancelled by the destructive interference generated by the transducer. The residual noise signal picked up by the feedback microphone may be transmitted to the ANC module and the signal processor, in step 407. The ANC module may then modify or generate an anti-noise signal associated with the residual noise signal for a subsequent cycle of noise cancellation.

Variations of those preferred embodiments will become apparent to those of ordinary skill in the art upon reading the foregoing description. Other embodiments will be apparent to those skilled in the art from consideration of the specification and practice of the disclosed noise control system. It is intended that the specification and examples be considered as exemplary only, with a true scope being indicated by the following claims and their equivalents.

What is claimed is:

1. An active noise control system for detecting, identifying, and cancelling specific, preselected sounds that an operator does not want to hear during operation of a machine, the active noise control system comprising:

one or more of a microphone or another sensor configured for detecting sound vibrations or other operational parameters that result in the generation of sound vibrations during operation of the machine;

wherein the machine is a vibratory compactor, and the active noise control system includes a sensor configured for detecting vibrations transmitted to machine parts or components of the machine by a vibratory drive shaft configured to introduce various vibration frequencies to compactor drums of the vibratory compactor; and a controller configured for:

identifying, and selectively cancelling only the specific, preselected sounds the operator does not want to hear while operating the machine by generating an anti-noise signal to interfere with the specific, preselected sounds.

2. The active noise control system of claim 1, wherein the active noise control system includes a sensor configured for detecting revolutions per minute (RPM) of an engine configured for propelling the vibratory compactor.

3. The active noise control system of claim 1, wherein the specific, preselected sounds include one or more of the sounds associated with operation of an engine or motor configured for propelling the machine, or the sounds associated with operation of any system or subsystem of the machine.

4. The active noise control system of claim 1, wherein the controller is configured for identifying the specific, preselected sounds by employing a noise model prediction system that compares incoming preselected noise signals with a library of existing noise models.

5. The active noise control system of claim 4, wherein the controller is further configured for performing a lookup function using data stored in the library to predict a future evolution of the noise signals.

6. The active noise control system of claim 5, wherein the controller is still further configured to produce anti-noise signals designed to create destructive interference with the predicted future evolution of the noise signals.

7. The active noise control system of claim 1, further including an operator input configured to enable the operator to identify the specific, preselected sounds the operator does not want to hear during operation of the machine.

8. The active noise control system of claim 1, further including at least one feedback microphone located inside of an operator's cabin on the machine configured to receive residual noise signals generated by a source outside of the operator's cabin and not completely cancelled by the anti-noise signal generated by the controller to interfere with the specific, preselected sounds.

9. A method for controlling the noise that an operator hears when operating a machine, the method comprising:

detecting sounds, using one or more of a microphone or another sensor configured for detecting sound vibrations or other operational parameters that result in the generation of sound vibrations during operation of the machine;

wherein the machine is a vibratory compactor, and the method includes detecting vibrations transmitted to machine parts or components of the machine by a vibratory drive shaft configured to introduce various vibration frequencies to compactor drums of the vibratory compactor;

identifying preselected sounds from the detected sounds that a machine operator does not want to hear during operation of the machine; and selectively cancelling only the preselected sounds the machine operator does not want to hear while operating the machine by generating an anti-noise signal to interfere with the preselected sounds.

10. The method of claim 9, wherein the method includes detecting revolutions per minute (RPM) of an engine configured for propelling the vibratory compactor.

11. The method of claim 9, wherein the preselected sounds include one or more of the sounds associated with operation of an engine or motor configured for propelling the machine, or the sounds associated with operation of any system or subsystem of the machine.

12. The method of claim 9, further including identifying the preselected sounds by employing a noise model prediction system that compares incoming preselected noise signals with a library of existing noise models.

13. The method of claim 12, further including performing a lookup function using data stored in the library to predict a future evolution of the noise signals.

14. The method of claim 13, further including producing anti-noise signals designed to create destructive interference with the predicted future evolution of the noise signals.

15. The method of claim 9, further including receiving an input from an operator that identifies the preselected sounds the operator does not want to hear during operation of the machine.

16. The method of claim 9, further including receiving residual noise signals generated by a source outside of an operator's cabin on the machine from at least one feedback microphone located inside of the operator's cabin, wherein the residual noise signals are not completely cancelled by the anti-noise signal generated by the controller to interfere with the preselected sounds.

17. A machine, comprising:

one or more of a microphone or another sensor configured for detecting sound vibrations or other operational parameters that result in the generation of sound vibrations during operation of the machine; and an active noise control system configured for identifying and cancelling specific, preselected sounds that an operator does not want to hear during operation of a machine, wherein the machine is a vibratory compactor, and the active noise control system includes a sensor configured for detecting vibrations transmitted to machine parts or components of the machine by a vibratory drive shaft configured to introduce various vibration frequencies to compactor drums of the vibratory compactor; the active noise control system comprising:

a controller configured for:

identifying the specific, preselected sounds, and generating an anti-noise signal to interfere with the specific, preselected sounds.

18. The machine of claim 17, wherein the controller is further configured for:

identifying the specific, preselected sounds by employing a noise model prediction system that compares incoming preselected noise signals with a library of existing noise models;

performing a lookup function using data stored in the library to predict a future evolution of the noise signals; and producing anti-noise signals designed to create destructive interference with the predicted future evolution of the noise signals.

* * * * *